United States Patent
Lindvall et al.

(10) Patent No.: US 11,827,571 B2
(45) Date of Patent: Nov. 28, 2023

(54) POLYCRYSTALLINE CUBIC BORON NITRIDE MATERIAL

(71) Applicants: Element Six (UK) Limited, Oxfordshire (GB); SECO TOOLS AB, Fagersta (SE)

(72) Inventors: Rebecka Lindvall, Lund (SE); Antionette Can, Oxfordshire (GB); Rachid M'Saoubi, Fagersta (SE); Filip Ernst Lenrick, Kaevlinge (SE); Volodymyr Bushlya, Lund (SE); Jan-Eric Stahl, Lund (SE)

(73) Assignee: Element Six (UK) Limited, Oxfordshire (GB)

( * ) Notice: Subject to any disclaimer, the term of this patent is extended or adjusted under 35 U.S.C. 154(b) by 0 days.

(21) Appl. No.: 17/791,407

(22) PCT Filed: Jan. 29, 2021

(86) PCT No.: PCT/EP2021/052071
§ 371 (c)(1),
(2) Date: Jul. 7, 2022

(87) PCT Pub. No.: WO2021/152067
PCT Pub. Date: Aug. 5, 2021

(65) Prior Publication Data
US 2023/0117547 A1  Apr. 20, 2023

(30) Foreign Application Priority Data
Jan. 31, 2020 (GB) ................................ 2001369

(51) Int. Cl.
*C22C 26/00* (2006.01)
*B23B 27/14* (2006.01)
(Continued)

(52) U.S. Cl.
CPC ........ *C04B 35/5831* (2013.01); *B23B 27/148* (2013.01); *C04B 35/478* (2013.01);
(Continued)

(58) Field of Classification Search
CPC ..... C22C 26/00; C22C 1/1068; C22C 1/1084; C22C 2026/003; C22C 29/16;
(Continued)

(56) References Cited

U.S. PATENT DOCUMENTS

2010/0132266 A1* 6/2010 Twersky ................. C22C 26/00
    51/309
2013/0034712 A1* 2/2013 Kudoh .............. C04B 35/62675
    428/323
(Continued)

FOREIGN PATENT DOCUMENTS

CN   105063455 A   11/2015
CN   109650907 A   4/2019
(Continued)

OTHER PUBLICATIONS

Combined Search and Examination Report issued for GB2001369.4, dated Jul. 20, 2020 (7 pages).
(Continued)

*Primary Examiner* — Shuangyi Abu Ali
(74) *Attorney, Agent, or Firm* — Armstrong Teasdale LLP

(57) ABSTRACT

This disclosure relates to a high cBN content polycrystalline cubic boron nitride, PCBN, material. The binder matrix material comprises 2 to 15 wt. % titanium diboride ($TiB_2$).

18 Claims, 12 Drawing Sheets

(51) Int. Cl.
　　　*C04B 35/5831*　　(2006.01)
　　　*C04B 35/478*　　(2006.01)
　　　*C04B 35/58*　　(2006.01)
　　　*C04B 35/628*　　(2006.01)

(52) U.S. Cl.
　　　CPC .. *C04B 35/58071* (2013.01); *C04B 35/62821* (2013.01); *C22C 26/00* (2013.01); *B23B 2226/125* (2013.01)

(58) Field of Classification Search
　　　CPC ............. B23B 27/148; B23B 2226/125; B22F 2005/001; B22F 2998/10; B22F 3/14; B22F 7/08
　　　See application file for complete search history.

(56) References Cited

U.S. PATENT DOCUMENTS

2013/0174494 A1　7/2013　Twersky et al.
2015/0291478 A1　10/2015　Sorai et al.

FOREIGN PATENT DOCUMENTS

| | | |
|---|---|---|
| EP | 2778146 A1 | 9/2014 |
| GB | 990818 A | 5/1965 |
| JP | S55119150 A | 9/1980 |
| JP | S63145726 A | 6/1988 |
| JP | 2012206902 A | 10/2012 |
| KR | 20190003696 A | 1/2019 |
| WO | 2009150601 A1 | 12/2009 |
| WO | 2017207601 A1 | 12/2017 |
| WO | 2020009117 A1 | 1/2020 |

OTHER PUBLICATIONS

Corrected Search Report issued for GB2001369.4, dated Aug. 6, 2020 (2 pages).
Combined Search and Examination Report issued for GB2101223.2, dated Mar. 29, 2021 (6 pages).
Combined Search and Examination Report issued for GB2101224.0, dated Apr. 1, 2021 (6 pages).
International Search Report and Written Opinion issued for PCT/EP2021/052071, dated Jul. 19, 2021 (20 pages).
International Search Report and Written Opinion issued for PCT/EP2021/052072, dated May 3, 2021 (15 pages).

\* cited by examiner

POLYCRYSTALLINE CUBIC BORON NITRIDE MATERIAL

CROSS-REFERENCE TO RELATED APPLICATIONS

This application is the § 371 national stage of International Application No. PCT/EP2021/052071, filed Jan. 29, 2021, which claims priority to Great Britain Application No. 2001369.4, filed Jan. 31, 2020.

FIELD OF THE INVENTION

This disclosure relates to the field of sintered polycrystalline cubic boron nitride materials, and to methods of making such materials. In particular, this disclosure relates to the machining of the titanium alloys using sintered polycrystalline cubic boron nitride materials.

BACKGROUND

Titanium alloys have a unique combination of material properties, qualifying them as a primary choice of material in components used in challenging environments common in aerospace, automotive, chemical and medical industry. The six most prominent material properties of titanium alloys are a high strength-to-weight ratio, resistance towards corrosion, low thermal expansion, low modulus of elasticity, low thermal conductivity and ability to maintain a high strength at elevated temperatures.

Yet, the same properties make titanium alloys difficult-to-machine materials, which causes issues for manufacturers who suffer from high production costs. This is due to low production rates employed to avoid rapid tool wear, catastrophic failure or plastic deformation of the cutting tool.

Active examples include the low modulus of elasticity, which is known to cause chatter; the low thermal conductivity and the ability to maintain a high strength at elevated temperatures generates high temperatures in the cutting edge. A seventh adverse property of titanium alloys is the strong chemical reactivity with tool materials, which in combination with high tool temperatures rapidly deteriorates cutting tools.

The main wear morphologies found when machining titanium alloys are crater wear, flank/nose wear, notching, cracking, chipping, plastic deformation and catastrophic failure. Cratering is commonly attributed to diffusion or dissolution wear mechanisms where a smooth worn surface is observed. Additionally, abrasion is coupled to flank wear development due to tool material softening at elevated cutting temperatures.

PCBN is capable of maintaining high hardness at elevated temperatures and therefore gains an increasing popularity when machining titanium alloys. Yet, PCBN materials have a higher cost compared to cemented carbide tooling and to be cost-effective they need to demonstrate higher productivity, for example, high cutting speeds and high metal removal rate.

To meet these demands there is a need for PCBN materials with advanced properties to improve tool-life during machining operations.

SUMMARY OF THE INVENTION

It is an aim of this invention to develop viable alternative materials for machining titanium alloys that perform well under extreme conditions.

According to a first aspect of the invention, there is provided a polycrystalline cubic boron nitride, PCBN, material comprising:
  between 70 and 95 vol. % cubic boron nitride, cBN, particles;
  a binder matrix material in which the cBN particles are dispersed, the content of the binder matrix material being between 5 vol. % and 30 vol. % of the PCBN material;
  the binder matrix material comprising at least 50 vol. % of a metal constituent,
  the binder matrix material further comprising titanium diboride (TiB2), the $TiB_2$ being present in an amount of 2 to 15 wt. % of the binder matrix material.

Preferable and/or optional features of the first aspect are provided in dependent claims 2 to 16.

According to a second aspect of the invention, there is provided a method of making polycrystalline cubic boron nitride, PCBN, material comprising the steps:
  Providing precursor powders comprising a metal constituent in elemental or compound form, the precursor powders comprising titanium or a compound thereof, and vanadium and/or chromium or compounds thereof;
  Attrition milling the precursor powders;
  Adding cBN particles to the milled precursor powders and mixing them together to form a precursor mixture;
  Compacting the precursor mixture to form a green body;
  Placing a carbide body adjacent to the green body; and
  Sintering the green body and carbide body at a temperature between 1300° C. and 1600° C. at a pressure of between 2 GPa and 6 GPa to form a backed sintered PCBN material comprising a carbide substrate.

Preferable and/or optional features of the second aspect are provided in dependent claims 18 to 24.

According to a third aspect of the invention, there is provided a tool comprising PCBN material in accordance with the first aspect of the invention for use in machining titanium, an alloy or a compound thereof.

According to a fourth aspect of the invention, there is provided use of a tool in accordance with the third aspect of the invention in machining an alloy or compound comprising titanium.

Preferable and/or optional features of the fourth aspect are provided in dependents claim 27 or 28.

BRIEF DESCRIPTION OF THE DRAWINGS

Non-limiting embodiments will now be described by way of example and with reference to the accompanying drawings in which.

DETAILED DESCRIPTION

Figure 1:
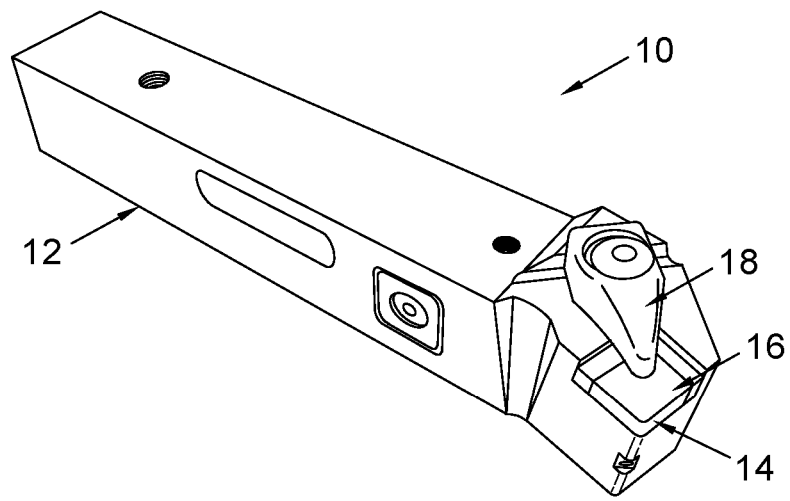
FIG. 1 is a perspective view of a known tool holder and tool insert for use in machining.

Referring to FIG. 1, a tool module for machining titanium alloys is indicated generally at 10. The tool module 10 is connectable to a tool assembly (not shown) on, for example, a mill or a lathe. The tool module 10 comprises an elongate tool holder 12 and an example cutting tool 14 detachably mounted at one end of the tool holder 12. An upper surface 16 of the tool 14 is held in place by a moveable clamp 18, typically urging against the upper surface 16 with a spring bias.

Figure 2:
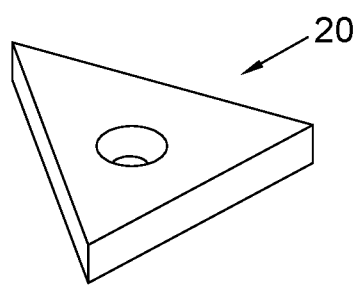
FIG. 2 is an example tool insert made from PCBN material suitable for use in the tool holder of FIG. 1.

FIG. 2 shows a second example of a cutting tool 20. Machining tools are typically made from polycrystalline materials such as polycrystalline diamond (PCD) or polycrystalline cubic boron nitride (PCBN).

Figure 3:
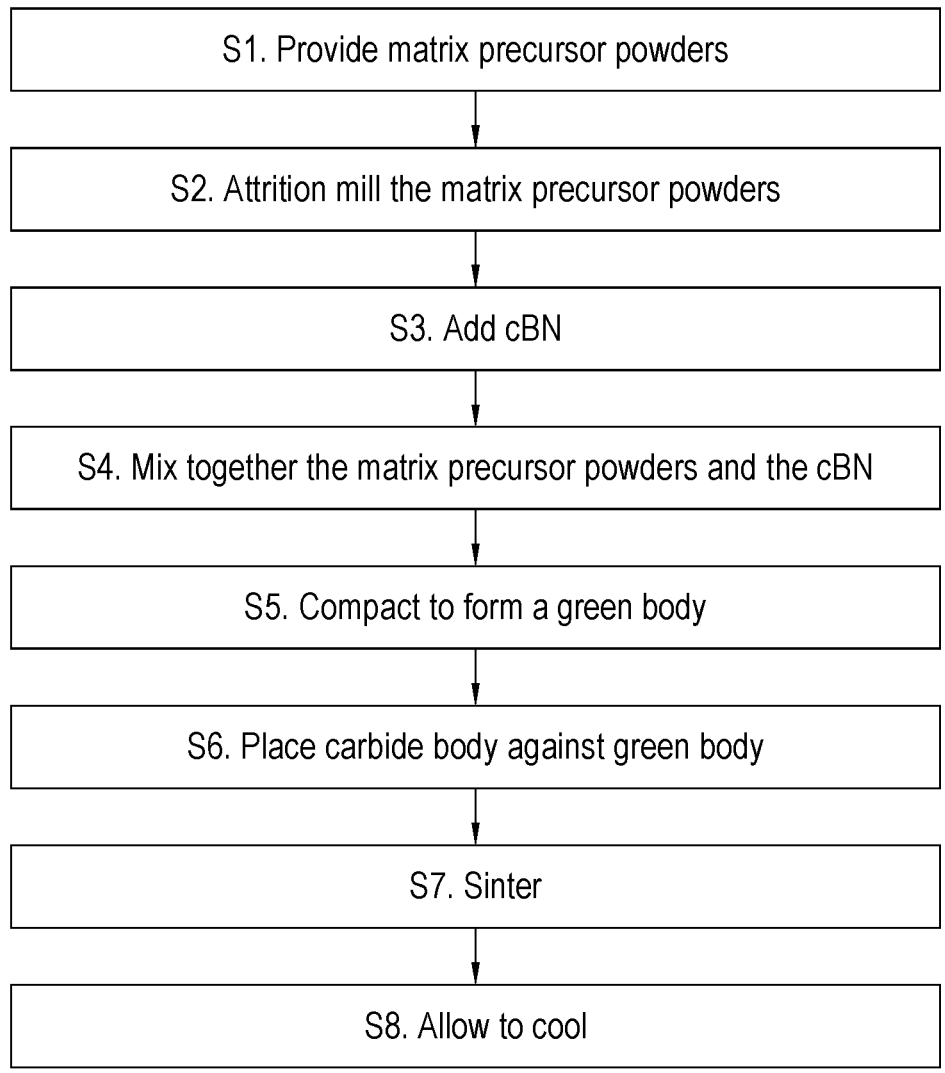
FIG. 3 is a flow diagram showing an embodiment of a process used to make the PCBN material in accordance with the invention.

FIG. 3 is a flow diagram showing example steps of making a PCBN material in accordance with the invention. The following numbering corresponds to that of FIG. 3.

S1. Matrix precursor powders are provided. Matrix precursor powders comprise a metal constituent and, optionally, a ceramic constituent. The metal constituent comprises titanium (Ti), vanadium (V) and/or chromium (Cr). The titanium may be provided in the form of a titanium-containing alloy. In such an embodiment, preferably, between 5 and 10 wt. % of the titanium-containing alloy is titanium. Alternatively, the titanium may be provided in elemental or compound form. More information on the matrix precursor powders is provided later. Optionally, the matrix precursor powders may comprise ceramic constituent titanium diboride ($TiB_2$).

S2. Matrix precursor powders are attrition milled together. This forms an intimate mixture and obtains a desired particle size.

S3. cBN particles are added to the milled matrix precursor particles. Preferably, the cBN particles have an average size of between submicron and 5 μm, preferably less than 2 μm. according to ISO standard 4499-2.2010, 'submicron' is understood to have a size of 0.5 to 0.8 μm.

S4. The milled matrix precursor particles and cBN particles are then mixed together. Preferably, this is using a high energy shear process.

S5. The milled matrix precursor powders are compacted together to form a green body in metal encapsulation before being putting into a High Pressure High Temperature (HPHT) capsule. Compaction is used to increase the density of the green body to avoid less dimensional change after sintering.

S6. A carbide body is placed contiguous the compacted green body to subsequently form a substrate. The carbide body has a cobalt (Co) content of 5 to 10 wt. %, preferable 7 to 8 wt. %.

Steps S5 and S6 may take place in either order.

S7. The green body is then subjected to high temperature vacuum heat treatment and subsequently sintered in a HPHT capsule.

Materials were sintered at a pressure of between 2 and 6 GPa and at a temperature between 1300° C. and 1600° C. The pressure may be between 2 and 5 GPa, or alternatively, the pressure is between 4 and 5.5 GPa.

The sintering temperature was calibrated using S-type thermocouples.

S8. After sintering, the resultant sintered articles cool to room temperature. The cooling rate is uncontrolled.

The sintered PCBN materials are characterised by a binder containing enhanced levels of Cr, Ti, $TiB_2$ and/or V depending on the matrix precursor materials used in S1 above.

Various samples of the sintered PCBN material were then taken for applications testing. These samples were assessed against a reference (commercial) PCBN material.

Applications Testing

Longitudinal turning was performed on a Ti6Al4V workpiece material using SMT Sajo 500 Swedturn CNC-lathe, with a motor power of 70 kW and spindle speed rated up to 4000 rpm. The machining was performed under finishing conditions. The cutting parameters are provided in Table 1.

TABLE 1

| Cutting parameters | |
| --- | --- |
| Cutting depth, $a_p$ [mm] | 0.3 |
| Feed, f [mm/rec] | 0.1 |
| Cutting speed, $v_c$ [m/min] | 300 |
|  | 350 |

A high pressure directed cooling (HPDC) system provided 90 bar coolant pressure directed at the rake face of the cutting tool with 8% oil-water emulsion. HPDC systems are used to increase tool life, reduce issues with chip breaking and to avoid chip ignition. The orthogonal cutting force components were acquired during machining using a Kistler piezo-electric 3-component dynamometer of type 9129A, which was connected to a computer through a Kistler 5070 amplifier and National Instruments 9223 ADC.

The chemical composition and mechanical properties of the workpiece material are presented in Table 2 and Table 3.

TABLE 2

| | Element | | | | | | | |
|---|---|---|---|---|---|---|---|---|
| | Fe | C | N | H | O | Y | Al | V | Ti |
| Wt. % | 0.17 | 0.021 | 0.006 | 0.0013 | 0.141 | <0.005 | 6.03 | 4.05 | Balance |

TABLE 3

| Tensile Strength [MPa] | Yield Strength [MPa] | Elongation | Reduction of Area [%] | Hardness [HRC] |
|---|---|---|---|---|
| 955 | 858 | 19 | 37 | 31 |

Figure 4:
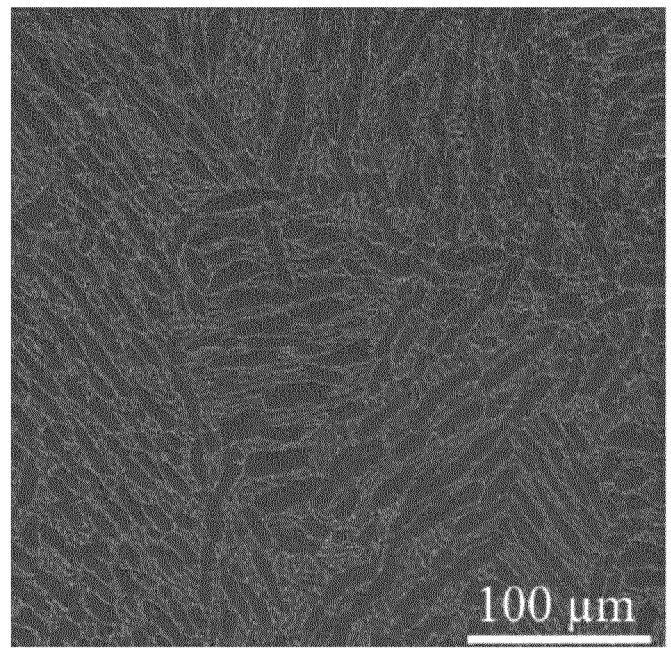
FIG. 4 is a Scanning Electron Microscopy (SEM) micrograph showing the microstructure of Ti6Al4V in mill annealed state.

The workpiece material was supplied in mill-annealed state (31 HRC) and its microstructure is presented in FIG. 4.

Each cutting tool was manufactured in DCMW11T304F-L1 insert geometry, which after assembly in a SDJCL3225P11JET tool holder, provided a major cutting edge angle of 93°, clearance angle of 7°, rake and inclination angle at 0°. The tools were sharp with an average edge radius of $r_\beta$=4 μm.

Flank wear and surface roughness were measured continuously during machining until reaching of the wear criterion, VB=300 μm. Measurements were made with an Olympus SZX7 optical stereo microscope. The surface was subsequently cleaned with 95% ethanol to remove coolant residues. Surface roughness value, $R_a$, was measured with a MarSurf PS1 on the surface of the workpiece. Crater wear was investigated with an Alicona Infinite Focus 3D optical microscope at the end of tool life. The worn cutting tools were additionally inspected with Tescan Mira3 SEM.

Etching of worn cutting tools and workpiece material was performed with HF-based etchant with the chemistry in Table 4. Cutting tools were immersed in mixture for 3.5 minutes to remove adhered titanium alloy. A polished sample of the workpiece material was etched with 200 μl for 2 minutes and used in microstructure imaging. 3D measurements and SEM inspection of worn tools was repeated after etching.

TABLE 4

| Ingredient | Concentration [vol. %] |
|---|---|
| Hydrofluoric acid (48%) | 20 |
| Nitric acid (65%) | 70 |
| Distilled water | 10 |

Transmission Electron Microscopy (TEM) specimens of un-etched cutting tools were prepared by lift-out procedure using a dual beam FIB-SEM, FEI Nova Nanolab 600, followed by thinning the lamellae to electron transparency. TM, XEDS and selected area electron diffraction (SAED) analyses were performed with JEOL 3000F Field Emission Electron Microscope equipped with an Oxford XEDS detector.

Reference Material

Applications testing was performed using reference (commercial) PCBN material, comprising 85 vol. % cubic boron nitride, cBN, particles and 15 vol. % binder. The composition of the binder phase is provided in Table 5 below.

TABLE 5

| Element | Proportion (%) |
|---|---|
| Al | 1.685 |
| Ti | 0.308 |
| Cr | 6.933 |
| Fe | 1.173 |
| Co | 20.35 |
| Ni | 52.325 |
| Cu | 0.582 |
| Nb | 2.85 |
| Mo | 2.949 |
| W | 10.745 |

Figure 5:
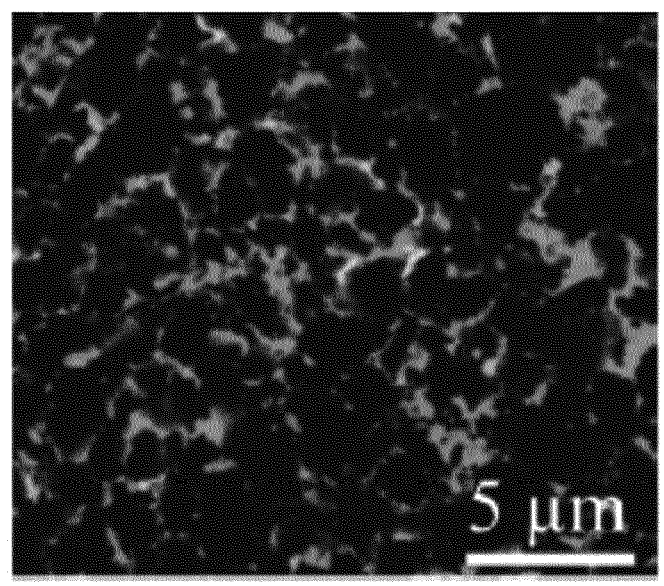
FIG. 5 is an SEM micrograph showing the microstructure of reference (commercial) PCBN material.

The microstructure of the reference PCBN material is shown in FIG. 5.

The Examples that follow were all produced following the steps above, with reference to S1 to S7.

Example 1

Applications testing was performed using Example 1 PCBN material, comprising 85 vol. % cubic boron nitride, cBN, particles and 15 vol. % binder. The binder phase of Example 1 is similar to that of the reference PCBN material (with less than 10 wt. % Cr) but also containing 2 to 5 wt. % $TiB_2$.

Example 2

Applications testing was performed using Example 2 PCBN material, comprising 85 vol. % cubic boron nitride, cBN, particles and 15 vol. % binder. The binder phase of Example 2 is similar to that of the reference PCBN material but with increased levels of Cr. Cr was present in an amount of 10 wt. % of the binder matrix material.

Example 3

Applications testing was performed using Example 3 PCBN material, comprising 85 vol. % cubic boron nitride, cBN, particles and 15 vol. % binder. The binder phase of Example 3 is similar to that of the reference PCBN material but with significantly increased levels of Cr. Cr was present in an amount of 20 wt. % of the binder matrix material.

Example 4

Applications testing was performed using Example 4 PCBN material, comprising 85 vol. % cubic boron nitride, cBN, particles and 15 vol. % binder. The binder phase of Example 4 is similar to that of the reference PCBN material but with significantly increased levels of Cr. Cr was present in an amount of 30 wt. % of the binder matrix material.

Example 5

Applications testing was performed using Example 5 PCBN material, comprising 85 vol. % cubic boron nitride, cBN, particles and 15 vol. % binder. The binder phase of Example 5 is similar to that of Example 2 but with added TiB$_2$. TiB$_2$ was present in an amount of 5 wt. % of the binder matrix material.

Example 6

Applications testing was performed using Example 6 PCBN material, comprising 85 vol. % cubic boron nitride, cBN, particles and 15 vol. % binder. The binder phase of Example 6 is similar to that of Example 3 but with added TiB$_2$. TiB$_2$ was present in an amount of 5 wt. % of the binder matrix material.

Example 7

Applications testing was performed using Example 7 PCBN material, comprising 85 vol. % cubic boron nitride, cBN, particles and 15 vol. % binder. The binder phase of Example 7 is similar to that of Example 4 but with added TiB$_2$. TiB$_2$ was present in an amount of 5 wt. % of the binder matrix material.

Example 8

Applications testing was performed using Example 8 PCBN material, comprising 85 vol. % cubic boron nitride, cBN, particles and 15 vol. % binder. The binder phase of Example 8 is similar to that of Example 2 but with added V. V was present in an amount of 17 wt. % of the binder matrix material.

Example 9

Applications testing was performed using Example 9 PCBN material, comprising 85 vol. % cubic boron nitride, cBN, particles and 15 vol. % binder. The binder phase of Example 9 is similar to that of Example 2 but with added V. V was present in an amount of 25 wt. % of the binder matrix material.

Example 10

Applications testing was performed using Example 10 PCBN material, comprising 85 vol. % cubic boron nitride, cBN, particles and 15 vol. % binder. The binder phase of Example 10 is similar to that of Example 2 but with added V. V was present in an amount of 35 wt. % of the binder matrix material.

Example 11

Applications testing was performed using Example 11 PCBN material, comprising 85 vol. % cubic boron nitride, cBN, particles and 15 vol. % binder. The binder phase of Example 11 is similar to that of Example 5 but with added V. V was present in an amount of 17 wt. % of the binder matrix material.

Example 12

Applications testing was performed using Example 12 PCBN material, comprising 85 vol. % cubic boron nitride, cBN, particles and 15 vol. % binder. The binder phase of Example 12 is similar to that of Example 5 but with added V. V was present in an amount of 25 wt. % of the binder matrix material.

Example 13

Applications testing was performed using Example 13 PCBN material, comprising 85 vol. % cubic boron nitride, cBN, particles and 15 vol. % binder. The binder phase of Example 13 is similar to that of Example 5 but with added V. V was present in an amount of 35 wt. % of the binder matrix material.

Further Examples

The composition of additional examples is provided in Table 6 below. Each sample comprised <5 wt. % Al, <5 wt. % Fe, <1 wt. % Ti, <20 wt. % Co, <60 wt. % Ni, <1 wt. Cu, <5 wt. % Nb, <20 wt. % Mo, <20 wt. % W. These components are in addition to the components listed in Table 6.

TABLE 6

| Example No. | Cr (wt. %) | TiB$_2$ (wt. %) | V (wt. %) |
|---|---|---|---|
| 1 | | 2.5 | |
| 2 | 10 | | |
| 3 | 20 | | |
| 4 | 30 | | |
| 5 | 10 | 5 | |
| 6 | 20 | 5 | |
| 7 | 30 | 5 | |
| 8 | 10 | | 17 |
| 9 | 20 | | 25 |
| 10 | 30 | | 35 |
| 11 | 10 | 5 | 17 |
| 12 | 20 | 5 | 25 |
| 13 | 30 | 5 | 35 |
| 14 | 10 | 2.5 | |
| 15 | 20 | 2.5 | |
| 16 | 30 | 2.5 | |
| 17 | 10 | 2.5 | 17 |
| 18 | 20 | 2.5 | 25 |
| 19 | 30 | 2.5 | 35 |
| 20 | 10 | 7.5 | |
| 21 | 20 | 7.5 | |
| 22 | 30 | 7.5 | |
| 23 | 10 | 7.5 | 17 |
| 24 | 20 | 7.5 | 25 |
| 25 | 30 | 7.5 | 35 |
| 26 | 40 | 5 | |
| 27 | 50 | 5 | |
| 28 | 40 | 2.5 | |
| 29 | 50 | 2.5 | |
| 30 | 40 | 7.5 | |
| 31 | 50 | 7.5 | |
| 32 | | 5 | |
| 33 | | 7.5 | |

Results
Performance and Behaviour

Table 7 presents the tool life, engagement distance, material removal rate (MMR) and maximum surface roughness (Ra) attained during machining for the reference PCBN material. Two different cutting speeds were tested, hence two cases labelled c and d were conducted.

TABLE 7

| | Cutting tool material PCBN | |
|---|---|---|
| Reference material, case: | c | d |
| Cutting speed, V$_c$ [m/min] | 300 | 350 |
| Tool life [min] | 5.7 | 3.3 |

TABLE 7-continued

| | Cutting tool material PCBN | |
|---|---|---|
| Reference material, case: | c | d |
| Engagement distance [m] | 1720 | 1140 |
| MRR [cm³/min] | 9.0 | 10.5 |
| $R_a$ [µm] | 1.1 | 1.6 |

PCBN tool life was nearly doubled when machining at cutting speed 300 m/min (case c) compared to 350 m/min (case d). Similarly, when generated surface roughness is used as the tool life criterion, a lower cutting speed (case c) is again preferred.

Figure 6:
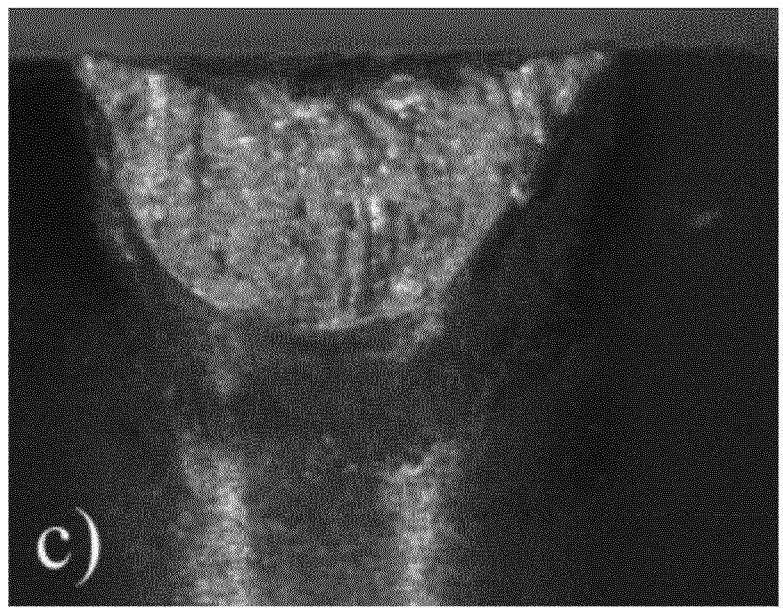
FIG. 6 is an optical image of flank wear in reference PCBN material, case c.
Figure 7:
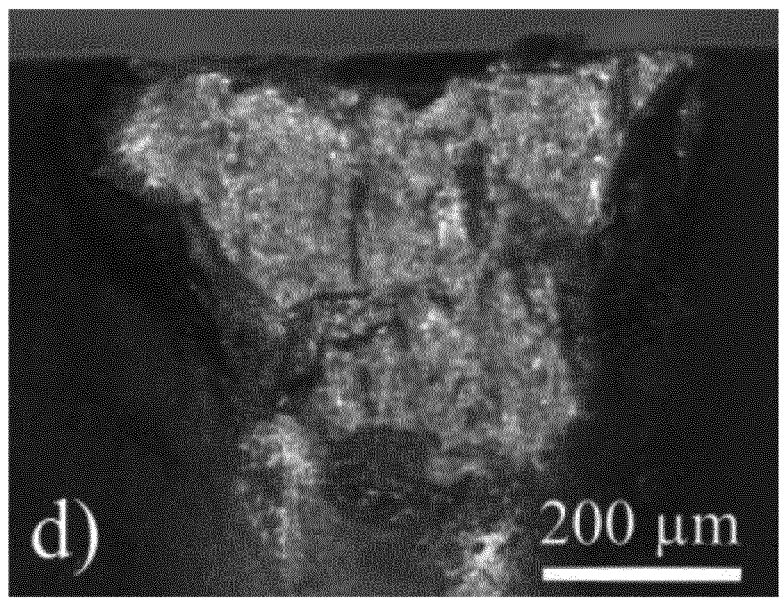
FIG. 7 is an optical image of flank wear in reference PCBN material, case d.

FIGS. 6 and 7 (same scale) present optical images of the flank wear for cases c) and d) when they reached or passed the wear criterion. Tool failure due to edge chipping and fracture along the wear land occurred when machining with reference PCBN material at Vc=350 m/min.

Wear Morphology

Figure 8:
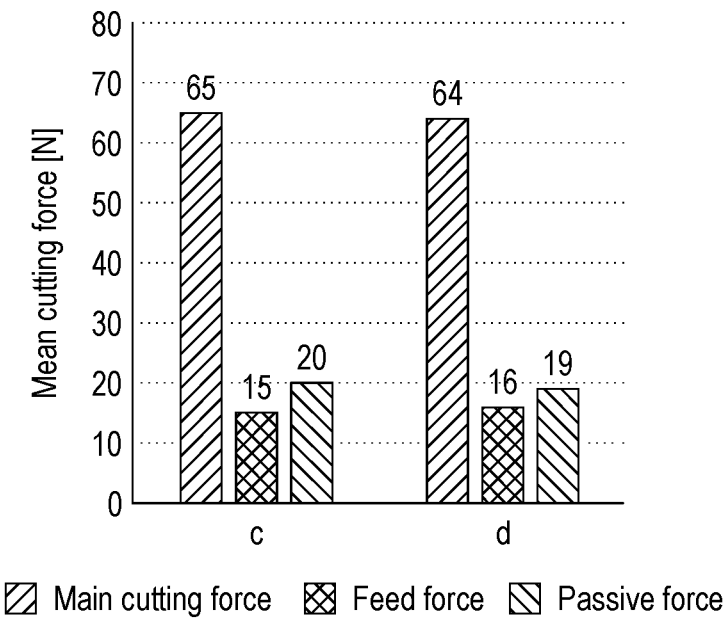
FIG. 8 is a column chart showing the mean cutting forces in the unworn state of tooling attained in reference PCBN material, cases c and d.

FIG. 8 demonstrate the values of cutting forces when machining reference PCBN tools in their unworn state. It can be seen that cutting speed has negligible influence on the cutting forces for both cases, most likely due to an already high level where process temperatures and materials softening are approaching an asymptotic value.

Figure 9:
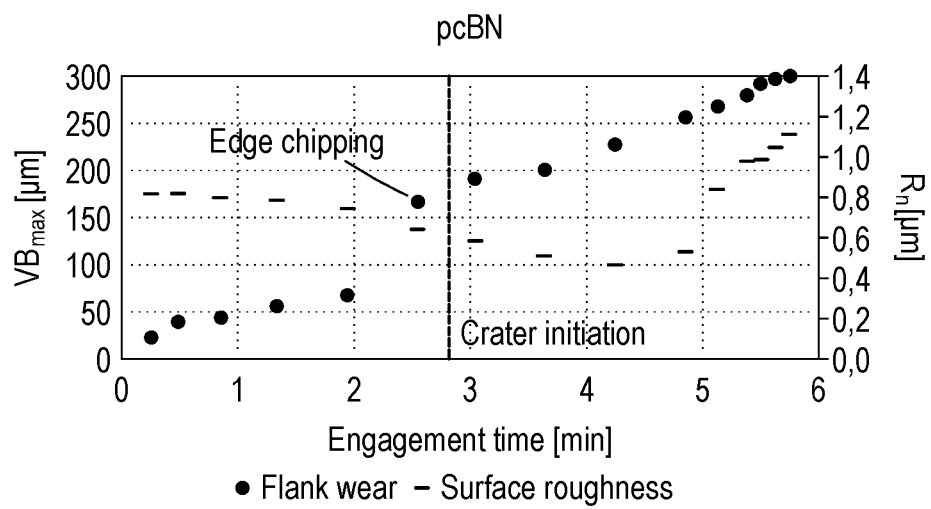
FIG. 9 is a scatter graph showing the evolution of flank wear and surface roughness with engagement time during machining by the reference PCBN material.

FIG. 9 demonstrate that the flank wear for PCBN increases faster after edge chipping has occurred and the crater is initiated.

Figure 10:
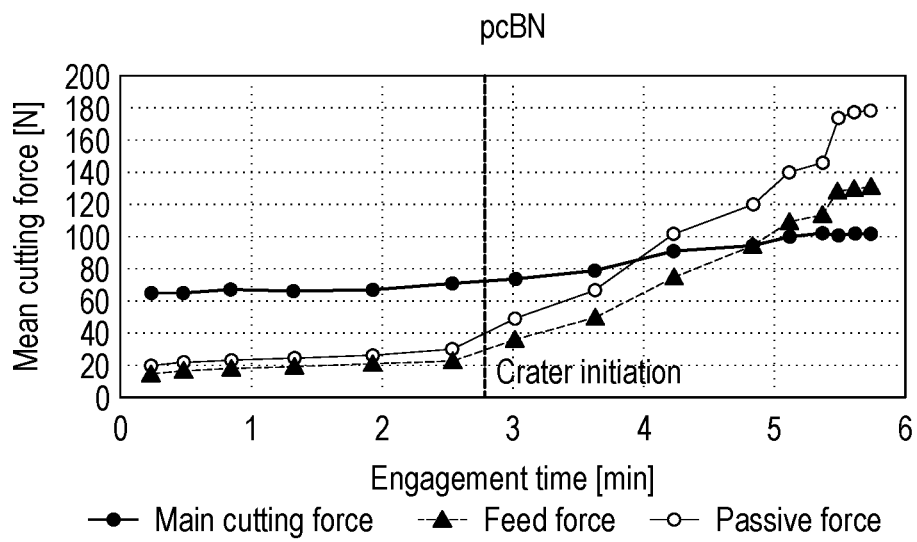
FIG. 10 is a line graph showing the cutting forces (mean cutting force, feed force, passive force) acquired during machining by the reference PCBN material.

FIG. 10 presents the evolution of the mean cutting forces during machining. The feed force and the passive force increase more than the main cutting force, especially after crater initiation. This is thought most likely related to the formation of the negative rake angle due to tool chamfering. Therefore, the passive cutting force increases the most, relative to the other forces. With the reference PCBN material, the mean passive force has increased nine times from the starting value.

Figure 11:
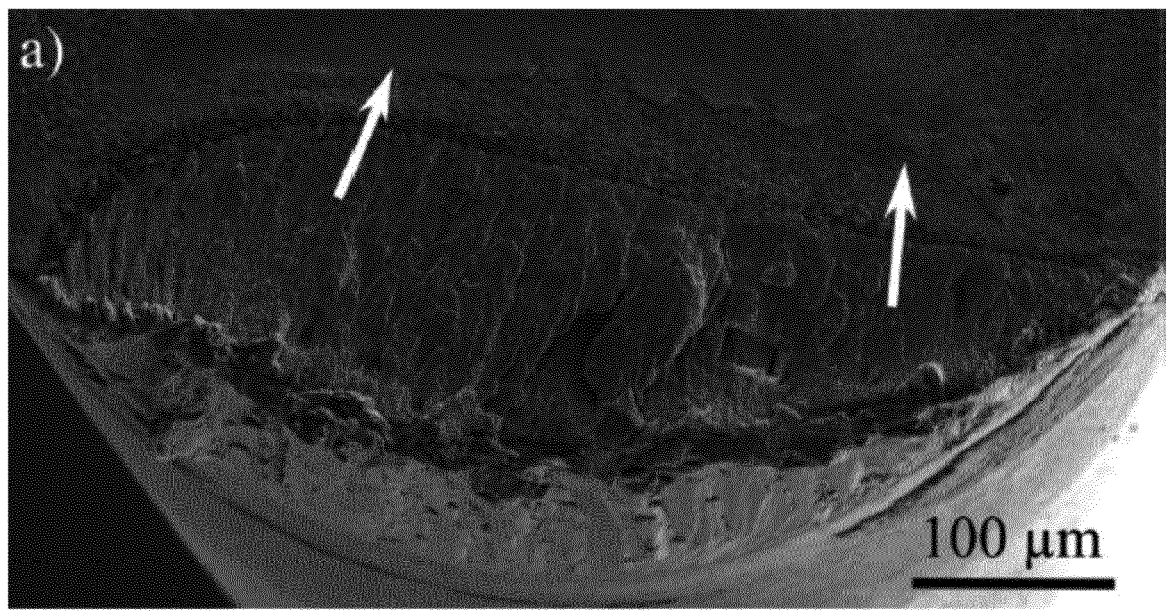
FIG. 11 is an SEM image of a worn PCBN tool made from the reference PCBN material with chip flow arrows.
Figure 12:
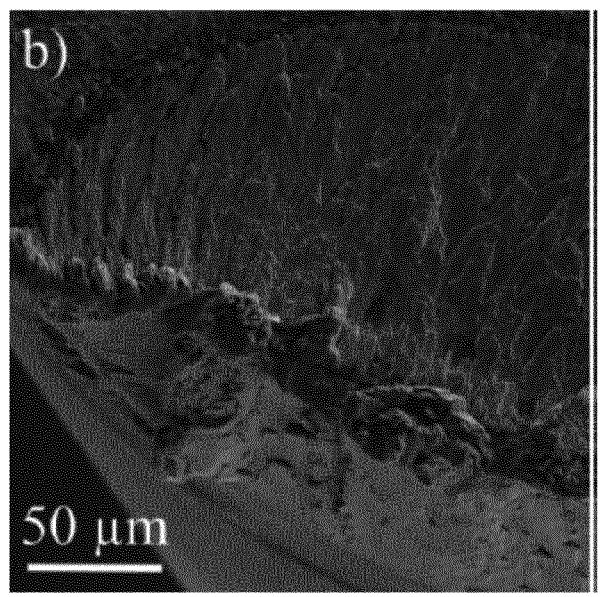
FIG. 12 is an SEM image of the worn tool of FIG. 10 showing an adhered layer of workpiece material on the flank.

FIG. 11 shows an SEM image of the worn reference PCBN material with chip flow marked by arrows. The adhered workpiece material covers almost the entire contact zone and may conceal other types of tool damage, e.g. edge chipping or facture. The thickness of the adhered layer is not measurable within the crater but FIG. 12 indicates that the largest thickness on the flank side is approximately 20 µm.

Figure 13:
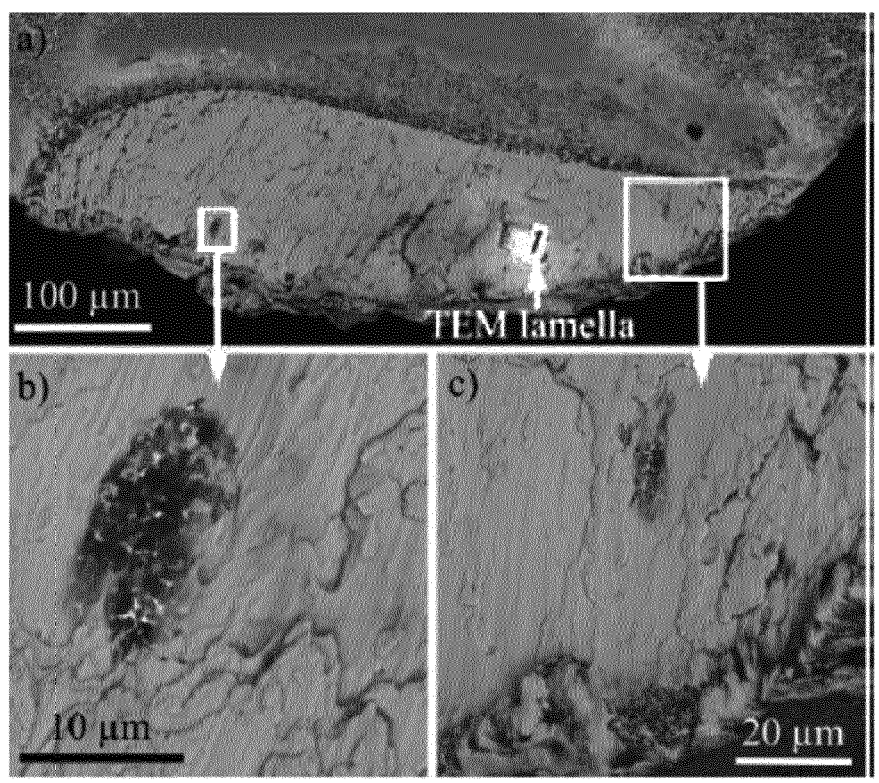
FIGS. 13 a) to c) are backscatter electron images of a) the rake of worn PCBN, and (b,c) local spots of exposed PCBN tool material.

Limited information can be gained from analysis of the flank of the worn PCBN due to excessive adhesion seen in FIG. 13. Under ambient pressure conditions, only a few small spots of exposed PCBN are visible near the edge line.

Figure 14:
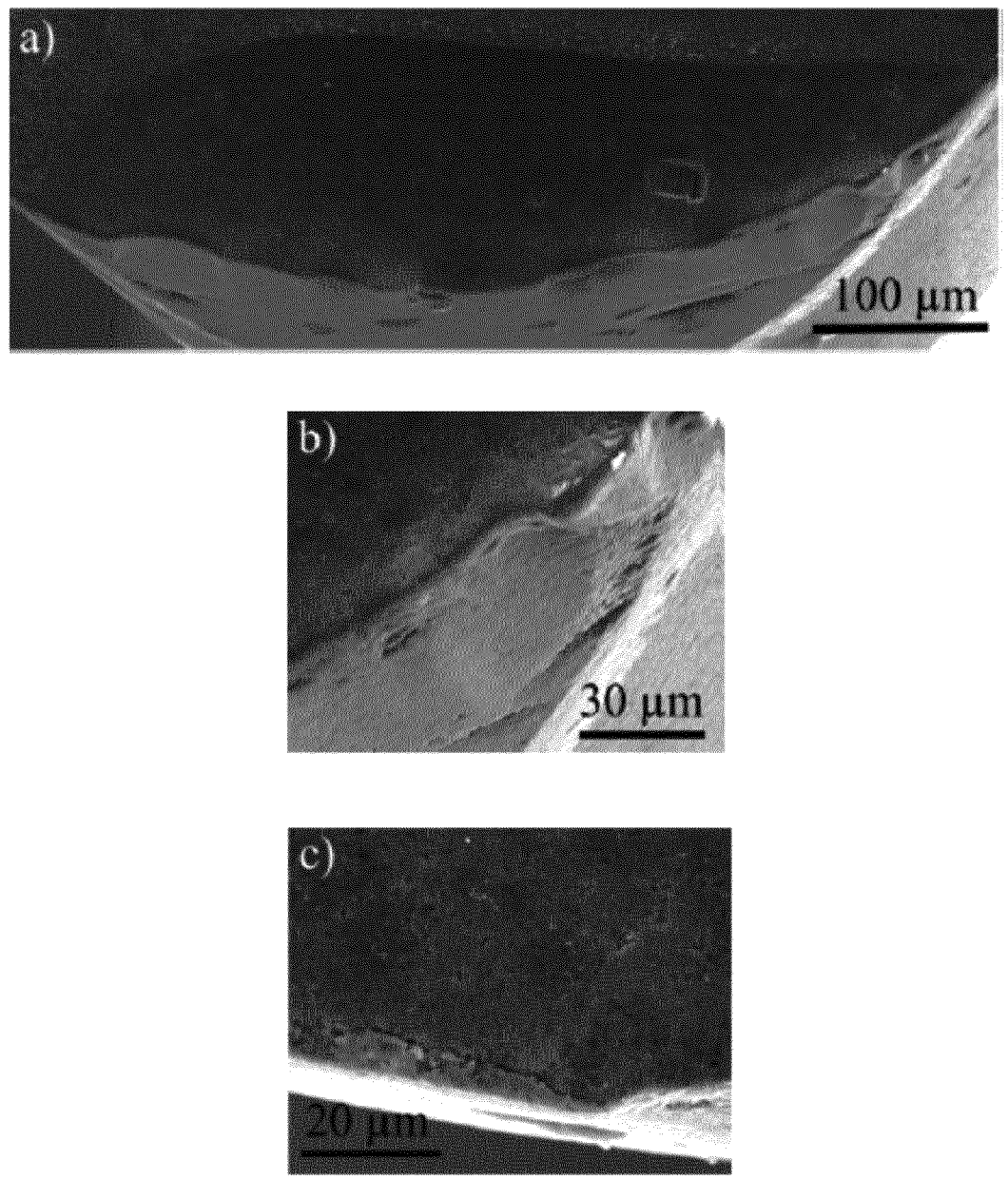
FIGS. 14 a) to c) are SEM images of a) the worn reference tool after etching, b) edge chipping, and c) micro-cracks.

Due to the high level of Ti6Al4V on the tool edge, etching of the reference PCBN tool was performed revealing the actual tool wear morphology presented in FIG. 14. Distinct edge chipping (FIG. 14a) and cracking on the flank wear land had occurred (FIG. 14b). Further analysis of the worn tool revealed the presence of micro-cracks on the rake face in the vicinity of the edge-line (FIG. 14c) making them the most likely cause of edge chipping. Close-up analysis of the worn surfaces also shows that despite higher binder content, formation of micro-craters on binder sites are not observed, therefore suggesting that PCBN binder does not liquefy under machining conditions.

Wear Mechanisms

Figure 15:
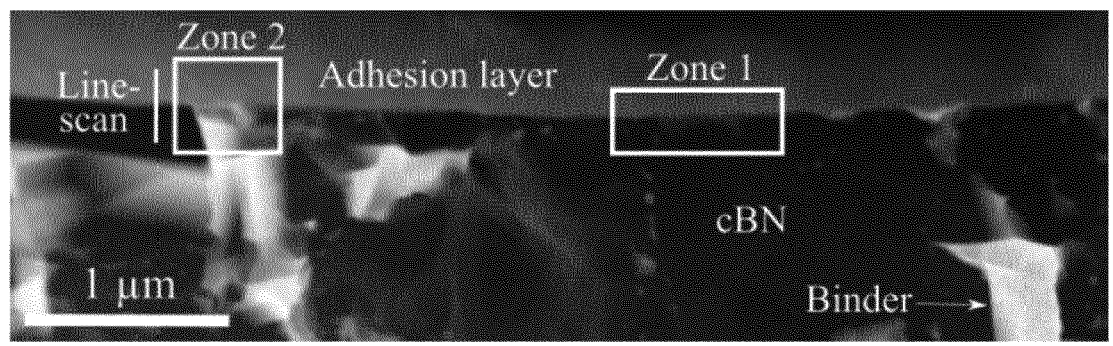
FIG. 15 is a STEM HAADF image of lamella extracted from the crater of worn reference PCBN material.

Cratering, flank wear, cracking and edge chipping are the main wear morphologies on the PCBN tool. The suggested wear mechanism for the cratering is diffusion and STEM, XEDS and electron diffraction studies were performed. FIB-life out procedure was done to extract TEM lamella from the crater with its location seen in FIG. 13a). Note that the lamella was extracted before tool etching. The lamella was thinned to electron transparency and is presented in FIG. 15, displaying the adhered workpiece material, multiple cBN grains and binder phase. Two highlighted zones, one including cBN-Ti6Al4V interface (Zone 1) and another including binder-Ti6Al4V interface (Zone 2), were subjected to detailed analysis.

Figure 16:
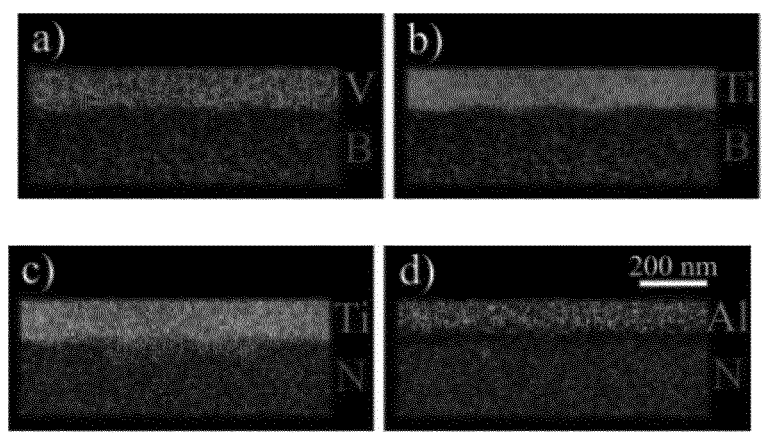
FIGS. 16 a) to d) are XEDS element maps of Zone 1 on the PCBN lamella.

The XEDS analysis of Zone 1 is presented in FIG. 16. It can be seen that titanium and vanadium signal has a slight overlap with the boron signal (FIGS. 16a to 16b), potentially indicating formation of chemical reaction products or outwards boron diffusion. Titanium (also vanadium) and nitrogen signal (FIG. 16c) do not exhibit an overlap but practically touch directly on the interface. The situation is different in the case of aluminium (FIG. 16d) where a 40 to 50 nm gap is formed between aluminium and nitrogen signals. Such gap might indicate either formation of reaction products not containing aluminium or presence of ß-titanium, stabilized by vanadium and depleted of aluminium. The latter case can be excluded because α-titanium is stabilized by boron and nitrogen.

Figure 17:
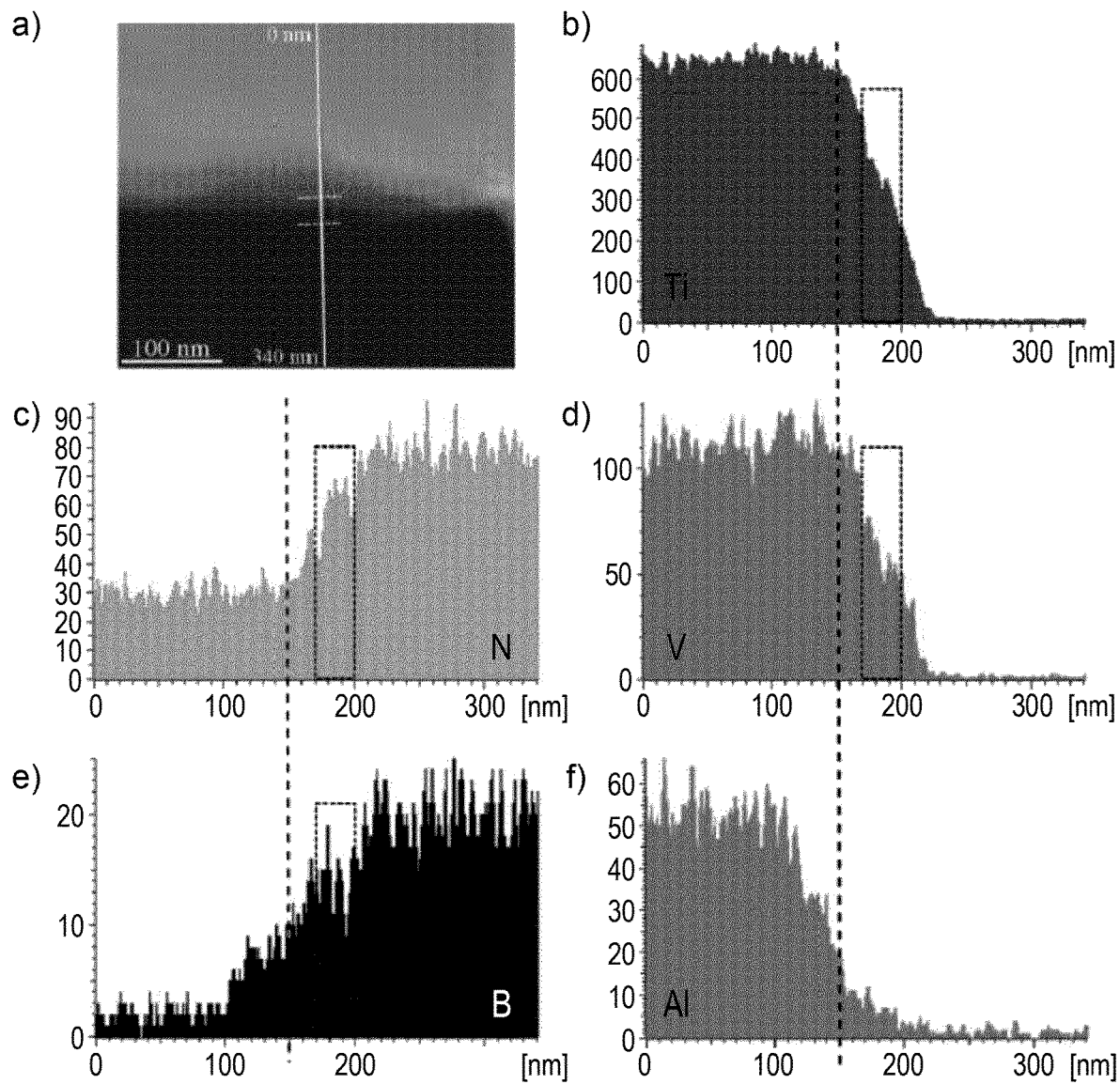
FIGS. 17 a) to f) are STEM HAADF images of cBN-Ti6Al4V interface with respective XEDS line scan data.

The XEDS line scan across the interface in Zone 1 (FIG. 17) shows a linear decrease in all respective signals indicating the interface tilt in the TEM sample. However, nitrogen signal has a distinct step (see dashed rectangle in FIG. 17) potentially pointing to a presence of reaction products.

Data also confirm that aluminium signal is shifted with respect to the other elements, suggesting that it does not participate in the interaction. Even more distinct is a strong boron signal in the interface region which implies a likely formation of borides. It is also seen that boron extends beyond the interface approximately 100 nm further into the workpiece material, thus confirming diffusional dissolution of boron and nitrogen as an actual wear mechanism of cBN.

Figure 18:
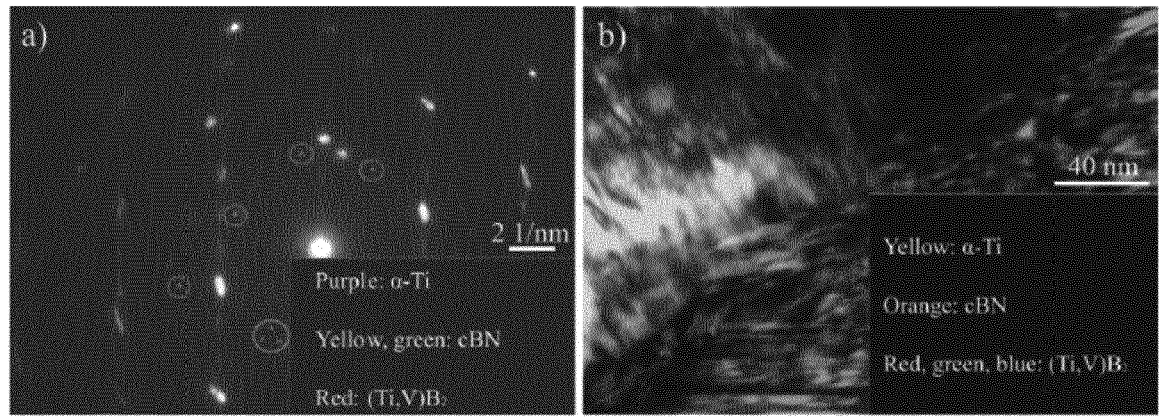
FIG. 18 is a) false colour SAED pattern and b) five superimposed false colour dark field TEM images of the cBN-Ti6Al4V interface.

Selected area diffraction (SAED) performed with the smallest aperture of 120 nm shows (FIG. 18a) presence of HCP α-titanium, cubic boron nitride, but also weak signal of reflections of phases (encircled) with space group 191 which corresponds to titanium diboride ($TiB_2$). Combining XEDS and SAED data allows concluding formation of solid solutions of borides of titanium and vanadium—$(Ti,V)B_2$. FIG. 18b depicts an image composed of five superimposed dark field TEM images taken with smallest diffraction plane (objective) aperture, as a way to include several reflections from each of the phases—$(Ti,V)B_2$, cBN and α-Ti. It is seen that boride reaction products are nanometric in size (30-50 nm), they are located directly on the interface and create a continuous film on the cBN surface. Thus these reaction products that are forming in-situ during the machining process act as a diffusion barrier for retarding diffusional dissolution of cBN in the adhered Ti6Al4V. Further FIB thinning of the TEM lamella allowed to avoid the influence of interface tilt depicted as dashed rectangle in FIG. 17. Nanobeam diffraction data confirmed absence of nitride reaction products, thus showing that $(Ti,V)B_2$ is the sole product of the chemical interaction.

Figure 19:
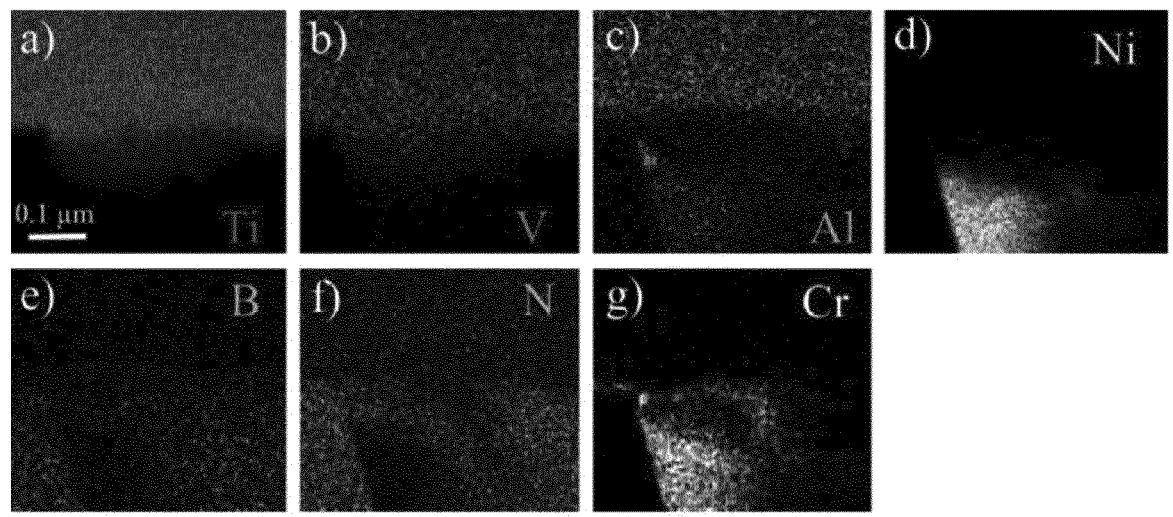
FIGS. 19 a) to g) are XEDS element maps of Zone 2 on the PCBN lamella.

To investigate an interaction area where binder is also present, XEDS of Zone 2 was also performed as presented in FIG. 19. It is seen that ingress of Ti and V occurs in the binder region deeper than the cBN interface level. This indicates that the dissolution rate of the binder is higher than the cBN. In particular, approximately 100 nm of the binder pool is depleted of nickel, whereas chromium remains stable and XEDS data show an overlap with Ti and V. Absence of the aluminium signal within this overlap region points to a similar mechanism as depicted in FIG. 16, meaning that a mixed boride of Ti, V and Cr forms.

Figure 20:
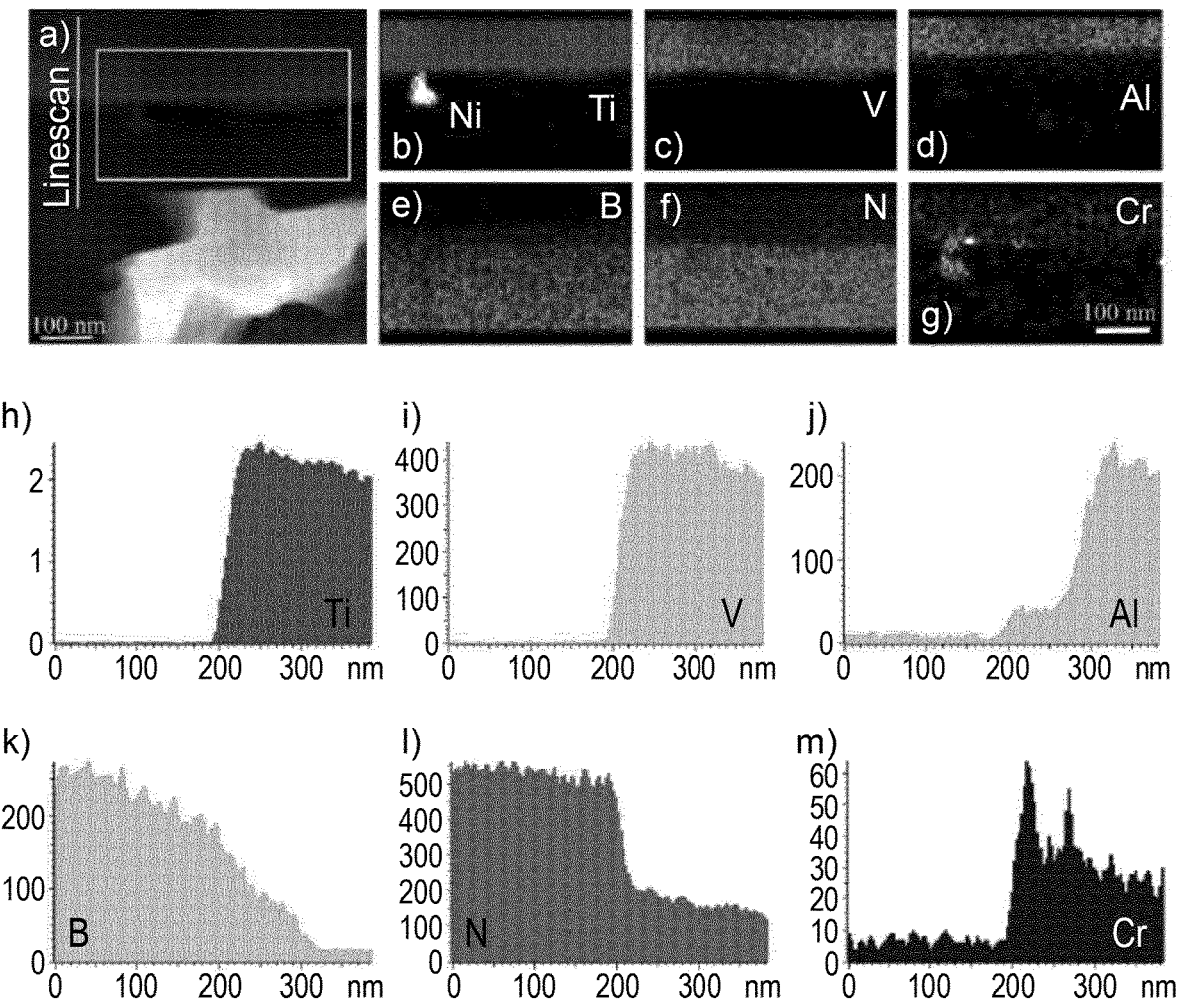
FIGS. 20 a) to m) are STEM HAADF images of cBN-Ti6Al4V interface near a binder pool in Zone 2 with respective XEDS elemental mapping and line scan data.

XEDS mapping and line scan (FIG. 20) performed on a side of Zone 2 of the further thinned lamella indicate that Cr not only remains within the original binder pool, but also extends along the adjacent cBN-Ti6Al4V interface creating a solid solution with Ti and V, thus confirming formation of $(Ti,V,Cr)B_2$.

This indicates that chromium-based binders can better withstand the diffusional attack and contribute to creation and stabilization of a protective on PCBN tools. Data from Zone 1 and Zone 2 (FIG. 15) indicate that a continuous protective layer of reaction products forms over the pcBN tool surface, including cBN and binder interfaces.

Examples 1 to 33

To harness the learnings from the analysis of the reference PCBN product, the materials in Examples 1 to 33 were formulated to control and enhance the continuous protective layer.

The additives listed in Table 6 were included in matrix precursor powders prior to sintering, in order to amplify the effect of the continuous protective layer formed of reaction products.

TEM, ZEDS and nanobeam diffraction studies have shown that a $(Ti, V)B_2$ protective layer forms on the cBN-Ti6Al4V interface and $(Ti,V,Cr)B_2$ protective layer forms in the binder region. In test, Examples 1 to 33 all demonstrated improved wear performance.

While this invention has been particularly shown and described with reference to embodiments, it will be understood by those skilled in the art that various changes in form and detail may be made without departing from the scope of the invention as defined by the appended claims.

Definitions

As used herein, "PCBN" material refers to a type of super hard material comprising grains of cBN dispersed within a matrix comprising metal or ceramic. PCBN is an example of a super hard material.

As used herein, a "matrix material" is understood to mean a matrix material that wholly or partially fills pores, interstices or interstitial regions within a polycrystalline structure.

The term "matrix precursor powders" is used to refer to the powders that, when subjected to a high pressure high temperature sintering process, become the matrix material.

The claims refers to average particle size. This is measured using an equivalent circle diameter (ECD) technique. The ECD distribution of a plurality of loose, unbounded and non-agglomerated grains can be measured by means of laser diffraction, in which the grains are disposed randomly in the path of incident light and the diffraction pattern arising from the diffraction of the light by the grains is measured. The diffraction pattern may be interpreted mathematically as if it had been generated by a plurality of spherical grains, the diameter distribution of which being calculated and reported in terms of ECD. Aspects of a grain size distribution may be expressed in terms of various statistical properties using various terms and symbols. Particular examples of such terms include mean, median and mode. The size distribution can be thought of as a set of values Di corresponding to a series of respective size channels, in which each Di is the geometric mean ECD value corresponding to respective channel i, being an integer in the range from 1 to the number n of channels used.

The invention claimed is:

1. A polycrystalline cubic boron nitride, PCBN, material comprising:
   between 70 and 95 vol. % cubic boron nitride, cBN, particles;
   a binder matrix material in which the cBN particles are dispersed, the content of the binder matrix material being between 5 vol. % and 30 vol. % of the PCBN material;
   the binder matrix material comprising at least 50 vol. % of a metal constituent,
   the binder matrix material further comprising titanium diboride ($TiB_2$), the $TiB_2$ being present in an amount of 2 to 15 wt. % of the binder matrix material, characterised in that the metal constituent comprises any of the following: vanadium (V) present in an amount of 15 to 50 wt. % of the binder matrix material and/or chromium (Cr) present in an amount of 2 to 50 wt. % of the binder matrix material.

2. The PCBN material as claimed in claim 1, wherein the $TiB_2$ is present in an amount of 2 to 10 wt. % of the binder matrix material.

3. The PCBN material as claimed in claim 2, wherein the $TiB_2$ is present in an amount of 2 to 5 wt. % of the binder matrix material.

4. The PCBN material as claimed in claim 1, wherein Cr is present in an amount of 2 to 20 wt. % of the binder matrix material.

5. The PCBN material as claimed in claim 1, wherein Cr is present in an amount of 4 to 15 wt. % of the binder matrix material.

6. The PCBN material as claimed in claim 1, wherein V is present in an amount of 15 to 40 wt. % of the binder matrix material.

7. The PCBN material as claimed in claim 6, wherein V is present in an amount of 15 to 20 wt. % of the binder matrix material.

8. The PCBN material as claimed in claim 6, wherein V is present in an amount of 20 to 30 wt. % of the binder matrix material.

9. The PCBN material as claimed in claim 6, wherein V is present in an amount of 30 to 40 wt. % of the binder matrix material.

10. The PCBN material as claimed in claim 1, comprising 75 to 92 vol. % cubic boron nitride, cBN.

11. The PCBN material as claimed in claim 1, comprising 80 to 93 vol. % cubic boron nitride, cBN.

12. The PCBN material as claimed in claim 1, wherein an average grain size of the cBN particles ranges from submicron to about 5 microns.

13. The PCBN material as claimed in claim 1, the binder matrix material further comprising aluminium or a compound thereof and/or titanium or a compound thereof.

14. The PCBN material as claimed in claim 13, wherein aluminium, Al, or a compound thereof, is present in amount of between 2 and 15 vol. % of the binder matrix material.

15. A tool comprising PCBN material as claimed claim 1, for use in machining titanium, an alloy or a compound thereof.

16. A method of using a tool as claimed in claim 15, the method comprising machining an alloy or compound comprising titanium using the tool.

17. The method as claimed in claim 16, wherein the alloy or compound comprising titanium is Ti6Al4V.

18. The method as claimed in claim 16, wherein a cutting speed, $V_c$, of the tool is 150 to 300 m/min.

* * * * *